(12) United States Patent
Marzolin et al.

(10) Patent No.: US 6,919,104 B2
(45) Date of Patent: Jul. 19, 2005

(54) PROCESS FOR TREATING ARCHITECTURAL MATERIAL

(75) Inventors: Christian Marzolin, Paris (FR); Roman Gerusz, Peronnas (FR)

(73) Assignee: Saint-Gobain Materiaux de Construction, Courbevoie (FR)

( * ) Notice: Subject to any disclaimer, the term of this patent is extended or adjusted under 35 U.S.C. 154(b) by 0 days.

(21) Appl. No.: 10/054,955

(22) Filed: Jan. 25, 2002

(65) Prior Publication Data

US 2002/0182334 A1 Dec. 5, 2002

Related U.S. Application Data

(63) Continuation of application No. PCT/FR00/02255, filed on Aug. 4, 2000.

(30) Foreign Application Priority Data

Jan. 10, 2002 (FR) .......................................... 00 02255

(51) Int. Cl.$^7$ ................................................. B05D 3/02
(52) U.S. Cl. ................... 427/385.5; 427/421; 427/426; 427/427
(58) Field of Search ............................ 427/385.5, 421, 427/426, 427

(56) References Cited

FOREIGN PATENT DOCUMENTS

| EP | 0 633 064 | 6/1994 |
|----|-----------|--------|
| EP | 0857770 | 8/1998 |
| FR | 2788707 | 7/2000 |
| JP | 09263466 | 10/1997 |
| JP | 10102429 | 4/1998 |
| JP | 10158079 | 6/1998 |
| JP | 10212809 | 8/1998 |
| JP | 10230169 | 9/1998 |
| JP | 10237354 | 9/1998 |
| JP | 11049588 | 2/1999 |
| JP | 11197600 | 7/1999 |
| WO | WO 97/10185 | 3/1997 |
| WO | WO 98/05601 | 2/1998 |

*Primary Examiner*—Bernard Pianalto
(74) *Attorney, Agent, or Firm*—Oblon, Spivak, McClelland, Maier & Neustadt, P.C.

(57) ABSTRACT

The subject of the invention is a process for treating a "permeable" architectural material by impregnation, comprising the spraying onto the architectural material to be treated of one or more liquid-phase dispersions of at least one type of photocatalytic compounds based on metal oxide or sulphide and of at least one type of compound for promoting the adhesion of the said photocatalytic compounds to the said architectural material.

The invention also relates to the liquid dispersions used and the architectural materials thus treated.

30 Claims, No Drawings

PROCESS FOR TREATING ARCHITECTURAL MATERIAL

This is a continuation of PCT/FR00/02255 filed on Aug. 4, 2000.

BACKGROUND OF THE INVENTION

1. Field of the Invention

The present invention relates to a process for treating architectural materials to give them new functionality.

2. Description of the Background

The materials more particularly targeted are those in buildings as fascia, cladding, roofing or flooring material and are capable of offering a certain level of porosity/permeability with respect to relatively liquid fluids, such as water, to a detectable depth, for example of at least a few microns. These are, in particular, materials such as fascia coatings, concrete slabs and paving stones, architectonic concrete, tiles, slates and all materials of various forms based on cement composition, concrete or terracotta, or stones such as granite or marble.

The new functionality which the invention is seeking to give them concerns anti-soiling, antifungal and/or bactericidal properties, obtained using semiconductor materials based on a metal oxide or sulphide, in particular based on titanium oxide crystallized in anatase form, having photocatalytic activity: specifically, these materials are capable, in a known manner, of initiating radical-mediated reactions bringing about the oxidation and degradation of organic products under the effect of a radiation of adequate wavelength, this being ultraviolet radiation as regards titanium oxide.

There is currently a genuine demand for this novel type of functionality: specifically, these materials used in construction have a tendency very quickly to lose their new appearance on account, firstly, of their presence in soiling environments, and, secondly, of their porosity and/or surface roughness, which facilitate the attachment of the soiling. The soiling frequently encountered is, for example, microorganisms which affect not only the appearance, but also, in the long term, the structural properties of the material. Thus, tiles become covered in algae, lichen or moss in a humid environment. This is likewise the case for concrete slabs and paving stones when they are used to make patios or in the enhancement of gardens, and fascia coverings also constitute a suitable substrate for the growth of vegetation of this type.

Soiling also arises from the encrustation generated by urban organic pollution, consisting in particular of industrial or motor vehicle soot, this soot additionally having a tendency to facilitate the attachment of mineral dust to the material, creating dark crusts on its surface.

Mention may also be made of soiling affecting flooring slabs, such as spent motor oil and grease, and fascias, such as graffiti.

Giving all these materials a "self-cleaning" function by means of photocatalytic active components thus appears to provide an at least partial response to this problem, by at the very least making it possible to spread out the cleaning operations, these active components promoting the degradation of organic species in the presence of oxygen, water and an appropriate radiation such as UV, i.e. generally under conditions of exposure to the natural ambient atmosphere.

Certain publications already mention the use of photocatalytic titanium oxide particles for treating architectural materials in order to obtain an anti-soiling effect.

Thus, patent application WO 97/10185 describes the deposition of photocatalytic coatings onto glass substrates, these coatings comprising photocatalytic $TiO_2$ particles and a mineral binder obtained from the high-temperature thermal decomposition of organo-metallic precursors.

Mention may also be made of patent application WO 98/05601 which describes the incorporation of photocatalytic $TiO_2$ particles directly into a hydraulic binder for cement compositions to make fascia coverings, and patent application EP-0 633 064 A1 describing coatings combining photocatalytic $TiO_2$ particles and an adhesive which has little capacity for photocatalytic degradation, such as a fluoropolymer, for treating glass or metal substrates in particular.

SUMMARY OF THE INVENTION

One aim of the invention is thus to improve the treatment of architectural substrates of the "permeable" type (this term having been explained above), with photocatalytic compounds, the improvement being aimed in particular at greater simplicity and/or greater flexibility of use, as well as greater staying power of these compounds on the said substrates.

DETAILED DESCRIPTION OF THE PREFERRED EMBODIMENTS

A subject of the invention is, firstly, a process for treating "permeable" architectural materials by impregnation, this process comprising the spraying onto the material of one or more liquid-phase dispersions of at least one type of photocatalytic compounds and at least one type of compounds for promoting the adhesion of the said photocatalytic compounds to the said architectural material.

The expression "permeable material" means any material used in construction which is capable of allowing liquid phases of the aqueous type to penetrate over a certain thickness, for example over at least 20 nm and in particular up to 100 $\mu$m or 50 $\mu$m, in particular over at least 1 $\mu$m to 10 $\mu$m, i.e. in particular all the types of materials mentioned in the preamble of the present application.

The term "impregnation" refers to the fact that the essential part of the treatment leads not only to a coating containing photocatalytic compounds and lying only at the surface of the material, but also to an introduction of these compounds into the very thickness of the material by virtue of the vector liquid phase and of the material's natural porosity. Once the material has been treated, in the manner detailed below, the photocatalytic compounds (referred to hereinbelow as "active agents" for the sake of brevity) diffuse over a certain thickness into a superficial zone of the material, lying flush with its surface, this impregnation optionally being "completed" by the formation of a coating over the material, this coating preferentially being thin or even discontinuous (or non-existent).

In general, the concentration of active elements in the material decreases gradually as the distance from its outer surface increases: a concentration gradient becomes established with the highest concentration in the zone flush with the outer surface of the material.

This impregnation, which takes advantage of the intrinsic porosity characteristics of the treated materials, is particularly advantageous: specifically, firstly, it is observed that the anti-soiling effect lasts longer when the active components diffused into the material rather than when they remained on the surface, such a diffusion making them easier to become "attached" to the substrate and thus giving them greater durability. Secondly, even though there is gradual wear of the material, the anti-soiling effect will endure on account of this diffusion, the wearing action gradually exposing a new active zone. Finally, it was found to be easier to maintain he visual appearance of the material by avoiding the genuine formation of a surface coat. In point of fact, it is a general requirement in the field of construction materials that any treatment subsequent to the manufacture of these materials should not result in any, or only the least possible, change in appearance, in particular in shade, colour intensity, gloss or matt appearance.

The compounds that are "active" with respect to photocatalysis are preferably made of optionally doped metal oxide(s), for example zinc oxide, tungsten oxide or tin oxide. The preferred example according to the invention concerns titanium oxide at least partially crystallized in anatase form, which is the crystalline phase which gives $TiO_2$ its photocatalytic properties. They may also be semi-conductors belonging to the sulphide family, also at least partially crystallized, such as zinc sulphide or boron sulphide. (In the text hereinbelow, for greater simplicity, mention will be made rather of titanium oxide, it being understood that the indications given are just as valid for the other semi-conductor materials mentioned above).

These "active" compounds of the $TiO_2$ type are advantageously used in the form of particles with an average diameter of not more than 150 nm or 100 nm, in particular between 20 nm and 60 nm, these particles preferably being in colloidal suspension in a liquid phase, in particular an essentially aqueous phase. In this way, the aggregation of the particles, which would appreciably reduce their efficacy, is avoided as much as possible. It is thus easier to disperse them homogeneously over the material, while avoiding any change in its appearance.

The adhesion promotor is an important characteristic of the invention: it is preferably soluble/dispersible in an essentially aqueous phase, just like the "active" compounds. The choice of water (in the majority, although small amounts of miscible organic solvents may be added) is particularly advantageous with regard to the materials to be treated: specifically, its cost, its availability and its absence of contaminants are very advantageous when it is a matter of using it in a large amount both in the factory for manufacturing the architectural material (tiles, slabs) and directly on the building site during the actual fitting of the material (fascia coverings), or, alternatively, after a cleaning or resurfacing operation, for example in the context of renovating buildings.

The adhesion promotor is preferably chosen so as to be chemically compatible with both the "active" compounds and the architectural material, in order as best as possible to ensure the homogeneous distribution and permanent fixing of the compounds to the material. To do this, it is chosen in particular such that it is capable, once sprayed onto the material, of becoming fixed thereon by curing, brought about by a chemical and/or physical change depending on its nature. This change can take place in a relatively short time after spraying or more gradually, without it being necessary to bring about this curing by a specific treatment such as heating. Specifically, in particular if the treatment takes place on the work site, during the laying or renovation of construction materials, it is important that the treatment should be as simple as possible to carry out (besides the fact that certain materials may not be able to withstand particular treatments). This spontaneous chemical and/or physical change, on exposure to the ambient atmosphere, can advantageously be a carbonatation, a reaction of crosslinking type and/or a hydrolysis. A change of physical type may be a coalescence.

It is advantageous for this chemical conversion to make them essentially insoluble in aqueous phase, in particular over a wide pH range (2–3). This is because, without an adhesion promotor, the "active" components in particulate form do not manage to become fixed and are very rapidly washed off, for example by rainwater. The role of the adhesion promotor is thus, firstly, since it is soluble/dispersible in a liquid phase like the "active" compounds, to become thoroughly mixed and associated with them. Next, the adhesion promotor permanently fixes them to the substrate by acting as a binder and matrix, on account of its curing. If it remained very water-soluble, the simple trickling of rainwater would very quickly entrain the active components out of the material. It is also important that the adhesion promotor, once cured, should itself as best as possible withstand the effect of photocatalytic degradation induced by its close contact with the "active" components.

Several families of adhesion promotor are advantageous. It is possible to select only one type of adhesion promotor or to combine several of them, in one or more liquid dispersions.

A first family is that of organometallic compounds, in particular tetraalkoxides of the form $M(OR)_4$, with M being a metal such as Ti or Zr and R being a carbon-based radical such as a linear or branched alkyl, which are all identical or different, in particular containing from 1 to 6 C. Mention may be made in particular of titanium or zirconium tetrabutoxide or tetrapropoxide. They may also be trialkoxides of the type MR' (OR)3 with R and R' being identical or different radicals such as the radicals described above. It may also be a metal halide, in particular a chloride such as $TiCl_4$.

All these compounds are highly hydrolysable and it is thus preferable, in order for them to remain stable until they are used, to combine them in their liquid phase with at least one chelating agent/stabilizer, for example such as a β-diketone, for instance acetylacetone (2,4-pentanedione), benzoyl acetone (1-phenyl-1,3-butanedione), diisopropyl acetyl acetone, acetic acid, diethanolamine or compounds of the glycol family such as ethylene glycol or tetraoctylene glycol.

Once these metal compounds have been sprayed onto the material to be gradually hydrolysed, they all tend to degrade by condensation/crosslinking to form a network with metal-oxygen bonds which has a particularly high affinity with the active components in the form of metal oxide particles such as $TiO_2$, and which is water-insoluble.

A second family is that of silicon alkoxides (silanes), for example of general formula $Si(OR)_3R'$, with R and R' having the same type of radical as in the case of the first family.

It was found to be advantageous to combine an adhesion promotor of the first family with an adhesion promoter of the second, in view of the similarity of their reactivity/behaviour and their good compatibility.

A third family of adhesion promoter is the family of alkali metal and/or alkaline-earth metal silicates or alumino silicates, such as sodium, potassium or lithium silicate. This type of compound, which is of mineral type, also cures by means of a reaction of polycondensation crosslinking type leading to the formation of a mineral network with silicon-oxygen bonds, which is water-insoluble and chemically similar to architectural materials such as tiles, most particularly terracotta.

A fourth family of adhesion promotor is that of polysiloxanes, which are silicon-containing compounds like silicates but are already in a polymeric form. Their gradual curing is a reaction which can be likened to a crosslinking of the polymers in question. They can be in the form of siloxane microemulsions or a mixture of silane(s) and siloxane(s).

It is seen that the choice of the type of adhesion promotor can be made from among very varied materials which may be of the type such as hydrolysable metal compounds, silicon-containing compounds or organosilicon compounds, in polymeric or non-polymeric form, depending in particular on the type of material to be treated and on the type of active components. They all have the common feature of being capable, by gradual curing, of creating a matrix which traps and fixes the photocatalytic particles to the architectural material, the curing being able to take place without any treatment subsequent to the spraying operation, and "starting" simultaneously with the evaporation of the liquid phase chosen to make the dispersions, which is generally mainly water.

Two variants are possible regarding the implementation of the treatment process: the way in which the dispersions are sprayed onto the material to be treated.

The first variant consists in spraying onto the architectural material a single dispersion in liquid phase, comprising both the photocatalytic "active" compounds and the adhesion promotor(s).

This variant has the advantage of simplicity, by using only one product, a single liquid dispersion minimizing any risk of operator error. On the other hand, the dispersion may prove to be more complex to formulate in order to ensure the compatibility of the active components and the adhesion promoters, without sedimentation. Additives allow stable dispersions to be obtained, but occasionally, depending on the case, with a shelf life once packaged which may prove to be insufficient.

The second variant makes it possible to overcome this constraint: it consists in using several dispersions in liquid phases, one or more of the dispersions containing active components and one or more others containing the adhesion promoters, and this plurality of dispersions can be sprayed simultaneously or sequentially onto the material to be treated. The embodiment of this variant which is particularly preferred consists, in a first stage, in spraying a dispersion containing the active components such as $TiO_2$ particles, and, in a second stage, in spraying a dispersion containing the adhesion promotor which will act as a fixative with respect to the particles already housed in the pores of the material. Between the two sprayings, it is preferable to leave an amount of time which is sufficient for the material to dry (i.e. for a substantial part of the water of the first dispersion to have evaporated).

In both variants, it is good practice to adjust the amount of liquid sprayed so as not to have any liquid trickling on the material, but rather complete impregnation well distributed over the entire surface of the material, the amount depending on the level of permeability of the material.

Advantageously, it is considered that an impregnation of the material with the dispersion(s) of up to 400 $\mu$m, in particular of up to 100 $\mu$m or 200 $\mu$m, is sufficient to obtain an appreciable anti-soiling effect. This depth of impregnation corresponds to the depth of penetration of the active components into the material, once they have been permanently fixed after drying and curing of the adhesion promotor.

One advantageous implementation of the process according to the invention consists in preparing and packaging the dispersion(s) in liquid chase in concentrated form, the dispersions being diluted and/or mixed just before use. This is most particularly recommended when construction materials are treated as they are laid or during their renovation on a work site, in order to avoid the storage of highly dilute and thus bulky dispersions and/or to allow the dilution to be adjusted as a function of the material to be treated using standardized concentrated dispersions. Specifically, the dispersion can be sold "ready-to-use", in which case the user uses the dispersion in the form provided, or as a "concentrated" dispersion, which the user will have to dilute appropriately. The important aspect is to have suitable concentrations in the "ready-to-spray" dispersions.

As mentioned above, in particular to stabilize the adhesion promotor, but also optionally to stabilize the active components as a colloidal suspension, it is preferable to add suitable additives to the dispersions, in particular organic compounds such as $\beta$-diketones, acids or bases to control their pH, for instance acetic acid or nitric acid, polycarboxylates, stabilizers such as compounds of the glycol family or compounds known as being coupling agents, for instance silanes.

It is thus known that $\beta$-diketones are capable of stabilizing in complex form organometallic compounds of the type $M(OR)_4$ or $MR'(OR)_3$ which can serve as adhesion promoters.

Similarly, polycarboxylates are capable of stabilizing the colloidal dispersion of photocatalytic particles. Glycol derivatives and acids have a favourable stabilizing effect with respect to some of the adhesion promoters and/or some of the active compounds of the invention.

The concentrations of active compounds and of adhesion promoters in the dispersions are adjusted appropriately. By convention, the solids contents indicated in the present text are those of the "ready-to-spray" dispersions mentioned above. To do this, it is customary to select the solids content of these dispersions as a characteristic, this solids content being measured in a known manner by a heat treatment of the order of 100° C., for example according to standard NF-T30-011. Preferably, the solids content of the dispersions corresponding to the photocatalytic compounds is not more than 30%, in particular not more than 20%, 15% or 10%, and preferably at least 0.5%. The preferred range is, for example, from about 1% to 5%.

Similarly, the solids content of the "ready-to-spray" dispersions corresponding to the adhesion promotor(s) is preferably adjusted to a value of not more than 20% or not more than 15% or not more than 10% or 5%, and in particular of at least 0.2%, for example between 0.25% and 2%.

As has been seen above, the material can be treated with a single dispersion containing all the compounds, or with several dispersions, in particular one containing the active components and another containing the adhesion promotor. Throughout the present patent, the term "dispersion" should be understood as meaning any predominantly liquid phase which contains solid and/or liquid compounds which may be in suspension (solid particles) or in dispersion, for example a colloidal dispersion, or which create emulsions or which are solubilized or dissolved. Thus, for example, for the purposes of the invention, a dispersion can concern a liquid phase comprising only the adhesion promoter which is fully dissolved in the liquid.

These solids contents selections result from an optimum compromise between various criteria a to be respected.

Specifically, the concentration of active compounds should be sufficient to obtain the desired functionality; however, too high a concentration is not free of drawbacks, in particular as regards the appearance of the material. Thus, if too large an amount of titanium oxide particles are sprayed and/or if they aggregate on the architectural material, they tend to whiten it and make it more glossy, which is not considered as generally desirable. The selection of the adhesion promotor takes into account the amount of active compounds to be fixed. It is seen that a ratio of from 1 to 10, in particular from 3 to 5, between the two solids (active compounds relative to the adhesion promoter) is desirable.

In general, the parameters of these dispersions and the amounts sprayed are preferably selected such that the amount of "solid" material (essentially the "active" compounds and the adhesion promotors, and optionally all the other additives) effectively fixed by the architectural material is not more than 10 g/m$^2$ and, for example, at least 0.5 g/m$^2$, preferably between 1 g/m$^2$ and 8 g/m$^2$, here also with the twofold objective of anti-soiling performance quality and minimization of change of appearance associated with the treatment. This is a "theoretical" amount calculated as a function of the amount of dispersion sprayed and of the concentration of compounds concerning the invention in the dispersion(s) sprayed (after evaporation of the water).

As mentioned above, one great advantage of the invention lies in the fact that the removal of the liquid phase of the dispersions and the curing of the adhesion promotor(s) after spraying onto the material can take place in ambient atmosphere, spontaneously, without a post-treatment such as a heat treatment being necessary.

In general, from about 100 ml to 10 liters of dispersion are sprayed per m2 of material to be treated.

A subject of the invention is also the dispersions themselves, in particular those combining the "active" compounds and the adhesion promotor(s) in the same liquid phase, with a solids content of all these compounds in the "ready-to-spray" dispersions generally of between 0.5% and 25%, in particular between 1% and 5%, about 50% to 80% of these solids consisting of the "active" compounds and about 20% to 50% of these solids consisting of the adhesion promotor(s).

A subject of the invention is also the architectural material described above once treated, i.e. having the anti-soiling, antifungal and/or bactericidal properties by impregnation to a thickness in particular of up to 400 µm, in particular of up to about 100 µm, and preferably of at least 20 nm, with photocatalytic metal oxide or sulphide particles, combined with one or more "fixatives" derived from the curing of compounds which are the adhesion promoters described above and optionally with one or more additives.

As mentioned above, the depth of impregnation of the material depends on a certain number of parameters, including the porosity of the material. However, the porosity can be defined according to different criteria and can be measured by different methods. One advantageous criterion is the diameter of the pores, in particular of the open pores, which are the ones accessible to impregnation. To give a non-limiting order of magnitude, it is generally considered that the pores in the coatings have a diameter which can range from a few tens of nanometers to one or a few millimeters, which can be measured, for example, by the known mercury porosity method. For tiles, the diameter is from about 15 nanometers to 15 µm. Concrete slabs or paving stones have a pore diameter which is essentially identical to that of the coatings.

Another criterion is the degree of accessible porosity of the material, which can vary widely depending on the material. Thus, for tiles in particular, this degree is from about 10% to 40%, in particular in the region of 20% to 25%.

For concretes, the porosity is measured by means of water absorption tests, in mass [lacuna] standardized tests for slabs and paving stones) which can be converted into volume: schematically, a portion of the material is immersed to saturate it with water, and it is then dried in an oven and the masses of the product before and after drying are compared (standard NF-P-31 301).

Other advantageous details and characteristics of the invention emerge from the description below of non-limiting implementation examples:

→ the first variant consists in treating the materials using an aqueous dispersion containing both the active compounds and the adhesion promotor.

In all the examples, the materials required for the treatment according to the invention are as follows:

→ the photocatalytic compound used is in the form of titanium oxide particles P at least partially crystallized in anatase form, with a diameter of about 40 nm, as a colloidal suspension in water, → a first adhesion promotor is titanium tetrabutoxide ("TBT"), → a second adhesion promotor is glycidoxypropyltrimethoxysilane ("glymo"), → various additives are used: nitric acid ($HNO_3$), acetylacetone ("acac"), polyethylene glycol ("PEG"), in particular of low molecular mass (200), acting as dispersants or stabilizers.

➲ Two impregnation solutions S1 and S2 were thus prepared:

①-25 g of PEG, 25 g of water containing 0.7% by volume of $HNO_3$ are added to 19 g of acac and 31 g of TBT, to give a solution "A", ②-80 g of water containing 0.08% by volume of $HNO_3$ are then added to 10 g of solution "A" to give a solution "B1", ③-10 g of $TiO_2$ particles in 170 g of water are added to 20 g of solution "B1" to give solution "S1", ③'-10 g of $TiO_2$ particles in 150 g of water are added to 40 g of solution "B1" to give solution "S2".

➲ Two solutions S3 and S4 were thus prepared:

①-25 g of PEG, 25 g of water containing 0.7% by volume of $HNO_3$ are added to 19 g of acac and 31 g of TBT, to give a solution "A", ②-80 g of water containing 0.08% of $HNO_3$ and 2.5 g of "glymo" are then added to 10 g of solution "A" to give a solution "B2", ③-10 g of $TiO_2$ particles in 170 g of water are added to 20 g of solution "B2" to give solution "S3", ③'-10 g of $TiO_2$ particles in 150 g of water are added to 40 g of solution "B2" to give solution "S4".

The table below summarizes the formulation of these four solutions, with the solids content (overall), that corresponding to $TiO_2$, that corresponding to each of the two promoters, and, expressed as percentages by weight relative to the aqueous phase, the various additives.

For the measurement of the TBT solids content, it is considered that it was 100% converted into $TiO_2$, and for the measurement of the solids content of the "glymo", it is considered that it is 100% converted into $SiO_2$.

TABLE 1

| Solution | Solids content | $TiO_2$ particles | TBT ($TiO_2$) | Glymo ($SiO_$) | PEG | acac | $HNO_3$ |
|---|---|---|---|---|---|---|---|
| S1 | 1.35 | 1.25 | 0.1 | 0 | 0.26 | 0.2 | 0.009 |
| S2 | 1.45 | 1.25 | 0.2 | 0 | 0.52 | 0.4 | 0.018 |
| S3 | 1.45 | 1.25 | 0.1 | 0.07 | 0.26 | 0.2 | 0.009 |
| S4 | 1.55 | 1.25 | 0.2 | 0.4 | 0.52 | 0.4 | 0.018 |

These solutions were applied by spraying onto the materials to achieve a coverage of about from 0.3 g/m² to 1 g/m² measured by weight (i.e. 0.3 g to 1 g of the mixture of compounds in Table 1 are fixed per m² of material treated)

➲ A first series of tests was carried out on fascia coatings, consisting of hydraulic coatings sold by the company Weber and Broutin and composed, as is known, of cement, fillers (fibres, limestone of sizes from about 20 μm to 100 μm), granulates (quartz, mica, sand from about 100 μm to 4 mm), additives and pigments. The coating concerned here is a white finishing coating which is scratched and washed, dried prior to the treatment: the dispersions are sprayed in the direction of the coating, in an amount allowing about 0.5 g/m² Of the compounds contained in the dispersions (after evaporation of the water) to be fixed.

➲ A second series of tests was carried out on concrete slabs sold by the company Stradal, under the reference "6512 polie": the solutions were sprayed in the direction of these slabs so as to fix about 0.3 g of material per m².

➲A third series of tests was carried out on tiles sold by the company Société Tuiles Briqueterie Française under the trade name "Romanée-Canal Rouge": the solutions being sprayed such that about 0.6 g of material is fixed per m².

→ The second variant consists in treating the materials with two dispersions, first by spraying a solution containing the $TiO_2$ particles onto the material, and then by spraying a second containing the adhesion promotor(s), this second spraying being carried out an amount of time after the first which is sufficient for the material to be substantially dry to the touch. The second dispersion thus acts as the fixative relative to the $TiO_2$ particles already introduced onto and into the architectural material.

➲ A series of tests was carried out on the slabs described above, using a first solution S5 of $TiO_2$ particles at a concentration of 1.25% in water, and then two types of solution containing the adhesion promotor:

→ either a solution S6 in the form of a siloxane microemulsion sold by Wacker under the name "SMK 2100", → or a solution S6' in the form of a solution based on water-soluble ammonium titanium lactate salt.

The solution S5 is sprayed so as to leave 2 g of material per m² treated.

The solutions S6 and S6' are sprayed so as to leave 0.3 g/m² and 0.6 g/m² for S6 (S6-1 and S6-2), and 0.2 g/m² and 0.6 g/m² for S6' (S6'-1 and S6'-2).

The properties of degradation of soiling by photocatalysis for all these treated materials were tested in the following way:

→ the measurement of the photocatalytic activity of a material consists in depositing a model soiling and assaying its disappearance in the course of an irradiation with ultraviolet rays. Since the materials treated here are opaque, the optical measurement selected is colorimetry. The model soiling is a black organic ink, → the procedure is as follows: the ink used is Pébéo 8050 photographic retouching ink. After dilution to 20% in water, the ink is sprayed onto the sample using a compressed-air gun. A Minolta CR-200 colorimeter is used to measure the colour L, a, b) The presence of ink induces a change in L of about 20 units. After drying for 2 hours, the sample s exposed to UV in a light box comprising 5 Philips Cléo Performance tubes, generating a dose of 5 W/m². The variation in L as a function of time, averaged over 3 measuring points, is thus noted. For each sample, the value measured is subtracted from that of a reference sample containing no $TiO_2$. Finally, this value is translated into a percentage of degradation. The variation in L for the reference sample is about 10% after illumination for 18 hours. It can be up to 100%, for a very active sample. The results obtained can be summarized in the following way:

➲ For the tests according to the first variant (spraying using only one dispersion), → as regards the coatings, all the coatings treated, whatever the solution S1 to S4 used, show a capacity to degrade at least 20% of the soiling in 1 hour. At the end of 5 hours, the coating treated with S1 degraded about 25% of the soiling, that treated with S2 degraded about 28% of the soiling, that treated with S3 degraded about 37% of the soiling and that treated with S4 degraded about 43% of the soiling. The control has no photocatalytic activity, → as regards the slabs, at the end of 5 hours, the slab treated with S1 degraded 22% of the soiling, that treated with S2 degraded 14% of the soiling, that treated with S3 degraded about 33% of the soiling and that treated with S4 degraded about 8% of the soiling. At the end of 10 hours, it is the slab treated with S3 which has the highest performance quality, having degraded 30% of the soiling (25% for the slab treated with S1, 23% for the slab treated with S2 and 13% for the slab treated with S4), → as regards the tiles, at the end of 5 hours, the degradations are at least 35% (treatment with S1), in particular 57% for the tiles treated with S4 and S3, and up to 70% for the tiles treated with S2. At the end of 10 hours, the degradation is at least 40% (S1), in particular 65% (S3 and S4) and up to 90% with S2.

It is thus found that all these materials have appreciable photocatalytic activity, with particularly high activity for tiles since they can degrade up to 90% of the model soiling. This is proof of the importance of the nature of the substrate chosen, both as regards its chemical nature and as regards its texture/porosity, for example.

Dispersions combining $TiO_2$ particles and one-component adhesion promoters (titanates which hydrolyse and crosslink gradually at least partially into $TiO_2$) or two-component adhesion promotors (in addition with a silane which becomes converted in the same way, at least partially into $SiO_2$) are thus efficient.

➲ For the tests according to the second variant (spraying in two steps), at the end of 5 hours, the slabs treated with S5 and then S6-1 degrade about 16% of the soiling and those treated with S5 and then S6-2 degrade about 25% of the soiling; the slabs treated with S5 and then S6'-1 degrade about 34% of the soiling and those treated with S5 and then S6'-2 degrade about 42% of the soiling. At the end of 10 hours, the results arise from 26% (S5+S6-1), 32% (S5+S6-2), 39% (S5+S6'-1) up to 47% (S5+S6'-2). Here also, appreciable anti-soiling activity was thus observed for the slabs, exceeding the 40% degradation level, in contrast with the slabs treated in a single stage.

It is thus seen that the process according to the invention proposes various embodiments which can be adjusted depending on the material to be treated and on the place of treatment, and which are generally easy to carry out (a simple water sprayer was used) with clear anti-soiling performance qualities.

It goes without saying that the invention can also comprise steps before or after the treatment making it possible in particular to give the material additional functionalities (for example water-repellency treatment) or to improve the efficacy of the anti-soiling treatment (priming pretreatment)

Although a significant portion of the photocatalytic active compounds migrate into the very thickness of the material by this method of deposition by spraying as a liquid phase, it also falls within the context of the invention that a portion remains at the surface to form a continuous or discontinuous film, the characteristics of which can be adjusted such that it is preferably essentially "neutral" in visual terms.

What is claimed is:

1. A process for treating a permeable architectural material by impregnation, comprising:
   spraying onto the architectural material having a surface to be treated, selected from the group consisting of fascia or building coatings, paving stones, architectonic concrete, tiles or any material based on a cement composition, concrete objects, terracotta, slate and stone, one or more liquid phase dispersions of at least one photocatalytic metal oxide or sulfide compound and at least one compound which promotes the adhesion of the photocatalytic compound to the architectural material, whereby, after spraying, removing the liquid phase of the dispersion from the surface of the architectural material and curing the at least one adhesion promoter spontaneously in ambient atmosphere.

2. The process according to claim 1, wherein the photocatalyst is titanium oxide in at least partially crystallized anatase form.

3. The process according to claim 1, wherein the photocatalyst is a particulate material having an average diameter of not more than 150 nm and is prepared as an aqueous colloidal suspension.

4. The process according to claim 3, wherein the photocatalyst is a particulate material having an average diameter of not more than 100 nm.

5. The process according to claim 4, wherein the photocatalyst is a particulate material having an average diameter between 20 nm and 60 nm.

6. The process according to claim 1, wherein the at least one adhesion promoter is soluble or dispersible in an aqueous phase.

7. The process according to claim 1, wherein the adhesion promoter, once sprayed onto the surface and impregnated into the architectural material, becomes fixed by curing initiated by a chemical or physical change, thereby essentially insolubilizing the applied material in an aqueous medium.

8. The process according to claim 1, wherein the chemical or physical change is hydrolysis, carbonation, cross-linking or coalescence.

9. The process according to claim 1, wherein the adhesion promoter is a tetraalkoxide or trialkoxide organometallic compound of the formula $M(OR)_4$ or $M(OR)_3R'$, wherein M is Ti or Zr and R and R' are each a linear or branched $C_{1-6}$-alkyl group, which are identical or different, a metal halide or a silicon alkoxide.

10. The process according to claim 1, wherein the adhesion promoter is an alkali or alkaline earth metal silicate or an aluminosilicate.

11. The process according to claim 10, wherein the adhesion promoter is potassium, sodium or lithium silicate.

12. The process according to claim 1, wherein the adhesion promoter is a polysiloxane.

13. The process according to claim 1, wherein the liquid phase of the dispersion is aqueous.

14. The process according to claim 1, wherein a single liquid dispersion comprising the photocatalyst compound and the adhesion promoter is sprayed onto the architectural material.

15. The process according to claim 1, wherein one or more dispersions containing photocatalytic compounds and one or more dispersions containing adhesion promoters are simultaneously or sequentially sprayed onto the architectural material.

16. The process according to claim 15, wherein, in sequence, a dispersion containing a photocatalytic compound is sprayed onto the architectural material followed by spraying one or more dispersions containing adhesion promoters.

17. The process according to claim 1, wherein the impregnation of applied material into the architectural material ranges to a depth ranging to 400 m from the surface.

18. The process according to claim 17, wherein the impregnation of applied material into the architectural material ranges to a depth ranging to 100 m.

19. The process according to claim 1, wherein the liquid dispersions of photocatalyst compound and adhesion promoter are prepared and packaged in concentrated form, which dispersions are diluted or mixed immediately prior to use.

20. The process according to claim 1, wherein the liquid dispersions prepared each comprise at least one dispersion stabilizer selected from the group consisting of chelating agents, $\beta$-diketones, acids, glycol compounds and silane polycarboxylates.

21. The process according to claim 1, wherein the dispersion of the photocatalyst compound when ready to spray is adjusted to a solids content of not more than 30% by wt.

22. The process according to claim 21, wherein the dispersion of the photocatalyst compound when ready to spray is adjusted to a solids content of not more than 10% by wt.

23. The process according to claim 22, wherein the dispersion of the photocatalyst compound when ready to spray is adjusted to a solids content of at least 0.5% by wt.

24. The process according to claim 23, wherein the dispersion of the photocatalyst compound when ready to spray is adjusted to a solids content between 1% and 5% by wt.

25. The process according to claim 1, wherein the dispersion of the adhesion promoter compound when ready to spray is adjusted to a solids content of at least 0.2 to not more than 20% by wt.

26. The process according to claim 25, wherein the dispersion of the adhesion promoter is adjusted to a solids content of at least 0.25 to not more than 2% by wt.

27. The process according to claim 1, wherein the amounts of photocatalytic compounds and adhesion promoter compounds fixed within the architectural material are at least 0.5 to not more than 10 $g/m^2$ of surface treated.

28. The process according to claim 27, wherein the amounts of photocatalytic compounds and adhesion promoter compounds fixed within the architectural material are at least 1 to not more than 10 $g/m^2$ of surface treated.

29. The process according to claim 1, wherein removal of the liquid phase of the dispersion(s) and curing of the at least one adhesion promoter occurs in the absence of a post-treatment.

30. A method of treating a permeable architectural material by impregnation, comprising:

spraying an aqueous liquid dispersion comprising:
i) a photocatalytic metal oxide or sulfide particulate compound;
ii) at least one organometallic compound, alkali or alkaline earth silicate or aluminosilicate, polysiloxane or silicon alkoxide; and
iii) optionally at least one additive selected from the group consisting of a β-diketone, an acid and a glycol compound onto a permeable architectural material, having a surface to be treated, selected from the group consisting of fascia or building coatings, paving stones, architectonic concrete, tiles or any material based on a cement composition, concrete objects, terracotta, slate and stone, thereby imparting anti-soiling, antifungal and/or antibacterial properties to the treated architectural material.

* * * * *